United States Patent

Richter

[11] Patent Number: 5,924,394
[45] Date of Patent: Jul. 20, 1999

[54] ROTARY/LINEAR CONVERTER

[75] Inventor: Paul Anthony Richter, The Gap, Australia

[73] Assignee: Richter Technology Limited, Australia

[21] Appl. No.: 08/849,924

[22] PCT Filed: Dec. 1, 1995

[86] PCT No.: PCT/AU95/00810

§ 371 Date: Jun. 2, 1997

§ 102(e) Date: Jun. 2, 1997

[87] PCT Pub. No.: WO96/18053

PCT Pub. Date: Jun. 13, 1996

[30] Foreign Application Priority Data

Dec. 9, 1994 [AU] Australia .................... PM 9985
Jan. 10, 1995 [AU] Australia .................... PN 0472
Sep. 1, 1995 [AU] Australia .................... PN 5170

[51] Int. Cl.⁶ .................................................. F02B 75/04
[52] U.S. Cl. ..................................... 123/48 B; 123/78 E
[58] Field of Search ........................... 123/78 BA, 78 E, 123/78 F, 48 B

[56] References Cited

U.S. PATENT DOCUMENTS

| | | | |
|---|---|---|---|
| 1,968,470 | 7/1934 | Szombathy | 123/48 B |
| 2,518,830 | 8/1950 | Staats . | |
| 2,822,791 | 2/1958 | Biermann | 123/48 B |
| 2,909,164 | 10/1959 | Biermann | 123/48 B |
| 3,180,178 | 4/1965 | Brown et al. . | |
| 4,055,106 | 10/1977 | Frey | 91/495 |
| 4,112,826 | 9/1978 | Cataldo | 123/78 F |
| 4,240,386 | 12/1980 | Crist | 123/48 B |
| 4,437,438 | 3/1984 | Mederer | 123/48 B |
| 5,113,809 | 5/1992 | Ellenburg | 123/48 R |
| 5,732,673 | 3/1998 | Mandella | 123/78 E |

FOREIGN PATENT DOCUMENTS

| | | |
|---|---|---|
| 1 003 503 | 3/1952 | France . |
| 1003503 | 3/1952 | France . |
| 1 005 801 | 11/1952 | Germany . |
| 1 005 801 | 4/1957 | Germany . |
| 1005801 | 4/1957 | Germany . |
| 3420529 | 12/1985 | Germany . |
| 623 386 | 5/1981 | Switzerland . |
| 623386 | 5/1981 | Switzerland . |

*Primary Examiner*—Noah P. Kamen
*Attorney, Agent, or Firm*—Cesari and McKenna, LLP

[57] ABSTRACT

An adjustable stroke reciprocating mechanism which includes a reciprocating member mounted for reciprocating movement, a rotating member mounted for rotation about a main axis (XX), a connecting rod operatively connected to the reciprocating member and a crank assembly including a crank arm having a longitudinal axis (Y) which is inclined with respect to the main axis (XX). At least a portion of the crank arm can revolve about the main axis, the connecting rod being operatively connected to the crank arm and its position adjustable along the length thereof in either direction along a longitudinal axis (Y). There is also provided various bearing mounting assemblies for use with the adjustable stroke reciprocating mechanism and carrier and shaft assemblies allowing controlled movement along the longitudinal axis (Y) of the crank arm.

18 Claims, 8 Drawing Sheets

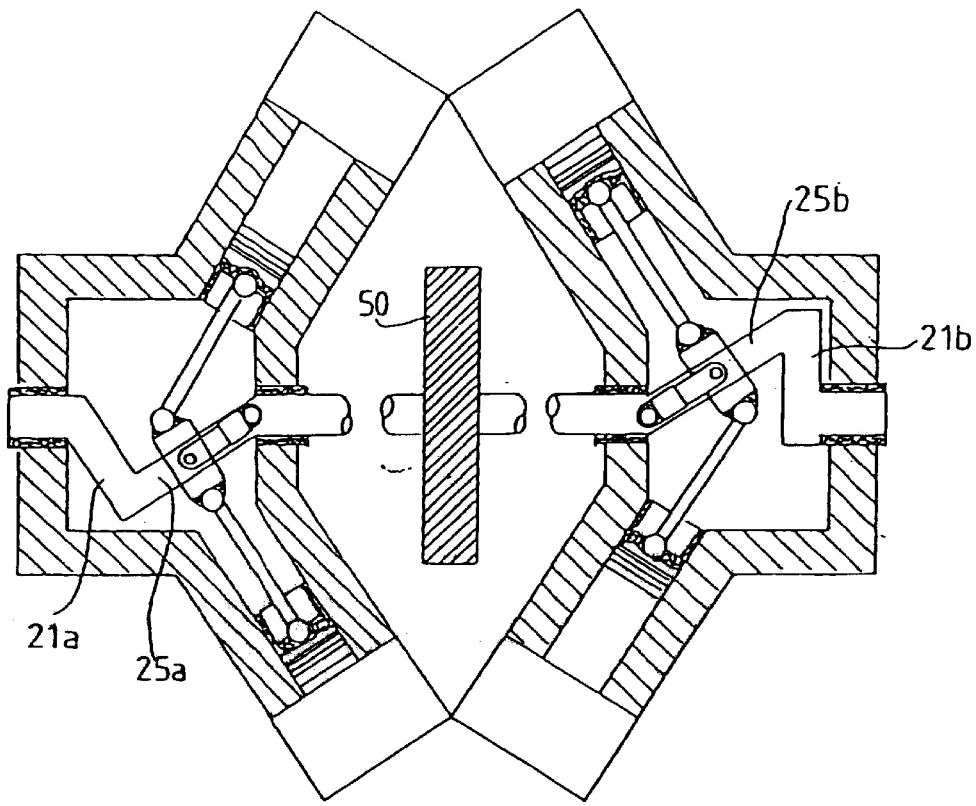
FIGURE 9
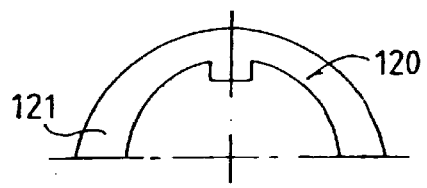
FIGURE 10 B
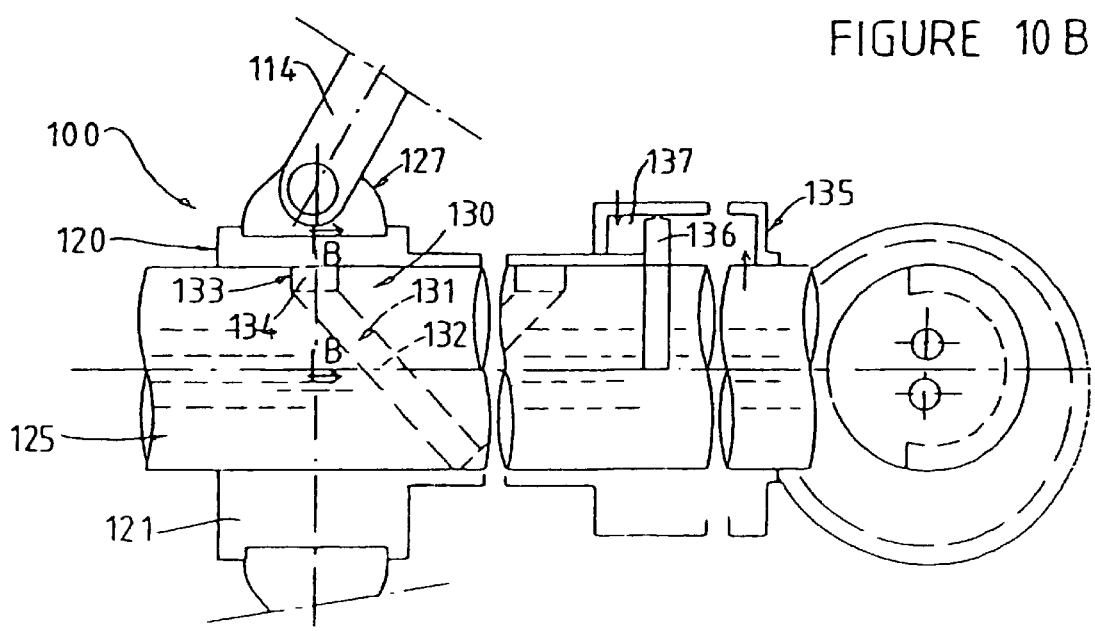
FIGURE 10 A
FIGURE 10 C

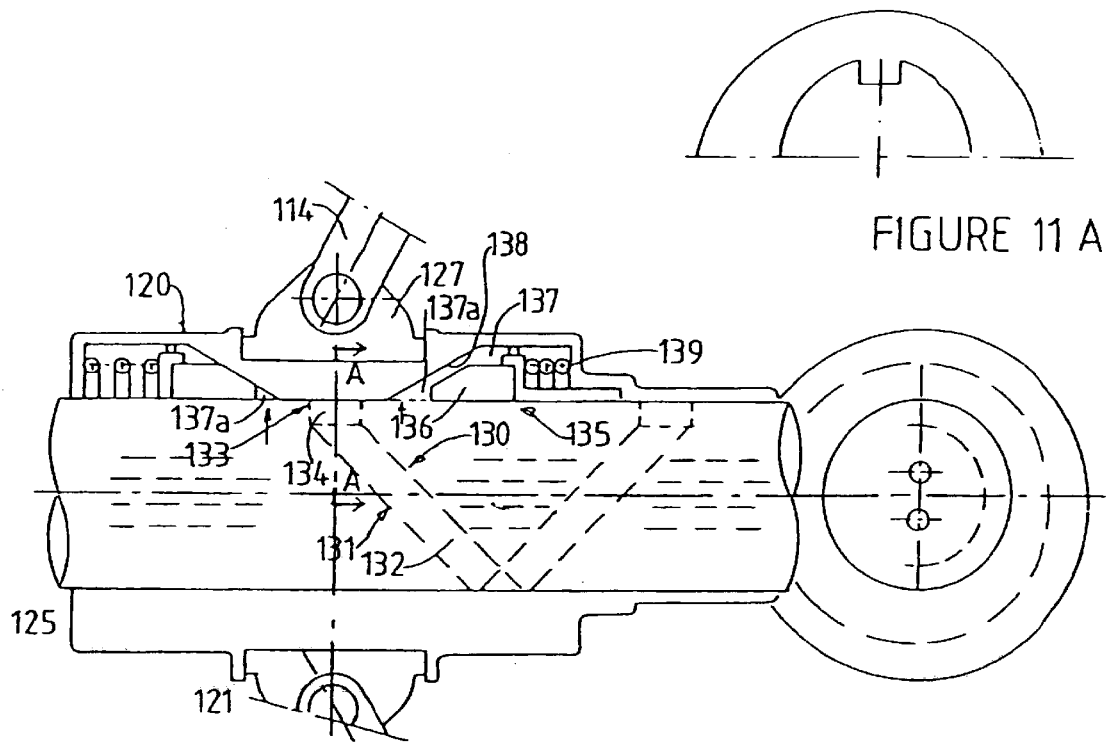
FIGURE 11 A
FIGURE 11
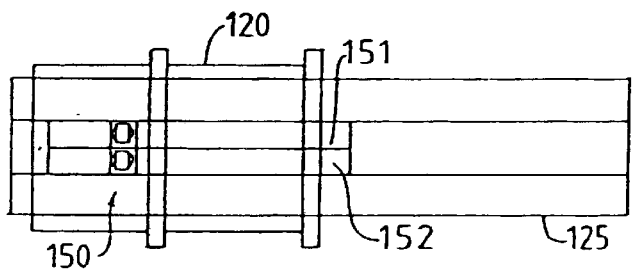
FIGURE 12 A
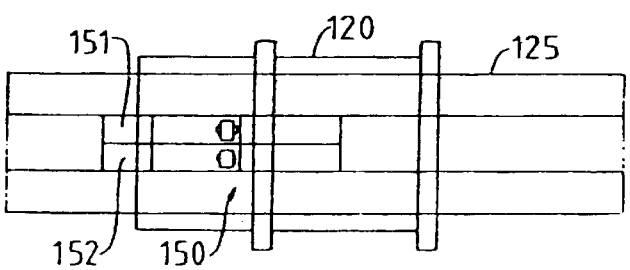
FIGURE 12 B
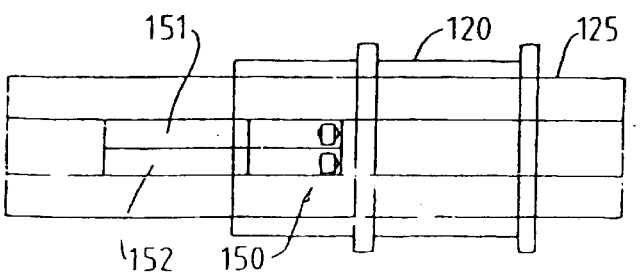
FIGURE 12 C

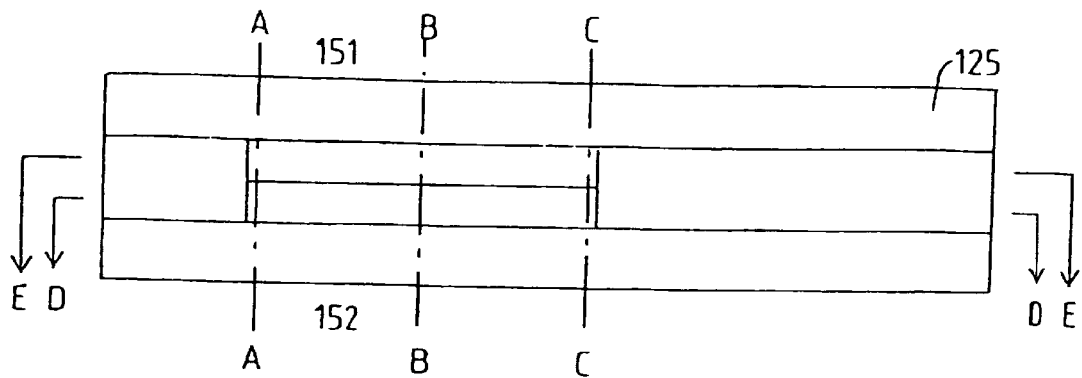
FIGURE 13
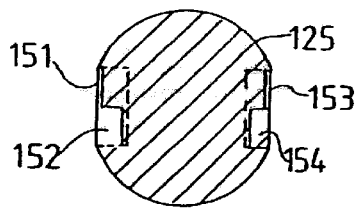
FIGURE 13 A
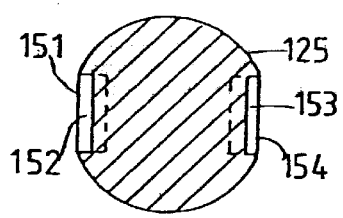
FIGURE 13 B
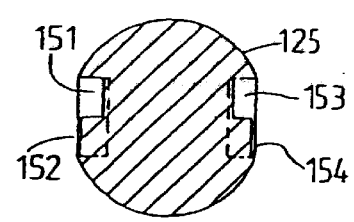
FIGURE 13 C
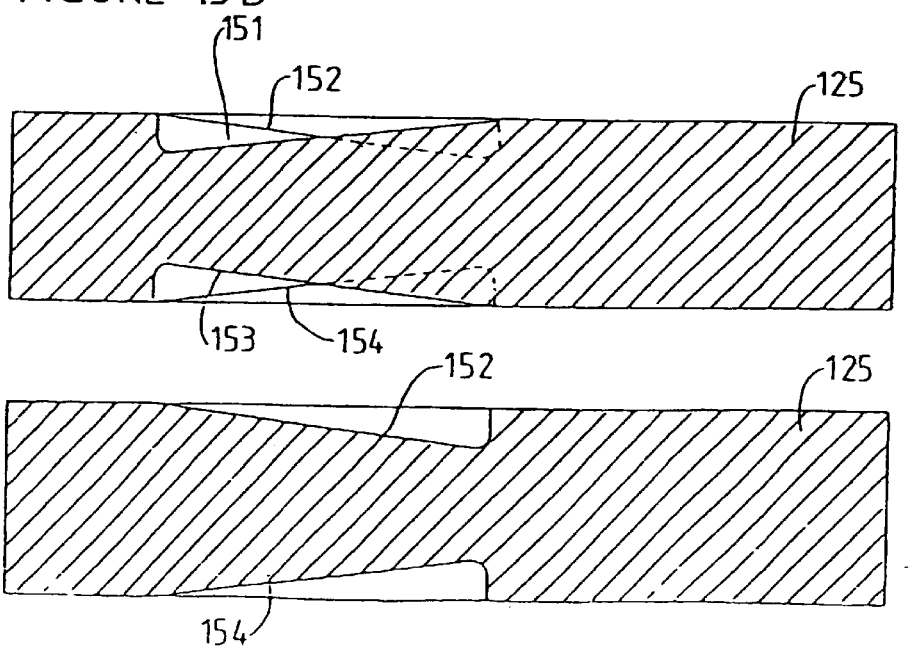
FIGURE 13 D
FIGURE 13 E

ROTARY/LINEAR CONVERTER

BACKGROUND OF THE INVENTION

This invention relates to apparatus for converting linear motion to rotary motion and vice versa. For example, this invention relates to reciprocating mechanisms in general and more particularly however not exclusively to a mechanism in which the stroke thereof can be varied.

One particular application of the present invention is in connection with engines, such as internal combustion engines. It will be convenient to hereinafter describe the invention with reference to that particular application, however it is to be understood that this is not to be considered as a limitation on the scope of the invention.

It is an object of the present invention to provide an adjustable stroke reciprocating mechanism which is relatively simple in construction and easy to maintain.

The many advantages of the present invention in it's basic or preferred forms will become readily apparent to those persons skilled in the art from a reading of the following description.

SUMMARY OF THE INVENTION

Basically, an adjustable stroke reciprocating mechanism according to one aspect of the present invention comprises a reciprocating member mounted for reciprocating movement, a rotating member mounted for rotation about a main axis, a connecting rod operatively connected to the reciprocating member and, a crank assembly including a crank arm having a longitudinal axis which is inclined with respect to the main axis, with at least a portion thereof being adapted to revolve about the main axis, the connecting rod being operatively connected to the crank arm and it's position adjustable along the length thereof in either direction along the longitudinal axis.

In one preferred form, the reciprocator may comprise a piston which is disposed within a cylinder, one end of the connecting rod being operatively connected to the piston and the other end being operatively connected to the crank arm.

It will be appreciated however that more than one piston cylinder and associated connecting rod assembly could be operatively connected to the same crank arm bearing. For example, the crank arm bearing could have four connecting rods extending from the bearing in different directions, each rod being connected to a respective piston of a piston/cylinder assembly. For example, six pistons and their associated connecting rods could be disposed at angles of 60° with respect to one another.

Preferably, but not necessarily, the crank arm has it's longitudinal axis disposed at right angles to the axis of reciprocation of the reciprocator when it is at top dead centre or at it s most remote position from the crank arm.

To provide a constant compression ratio over the variation of the stroke (as is necessary for internal combustion engines), a deviation of the cylinders right angle axis to the crank arm may be chosen depending on the connecting rod positions on the crank arm at min/max stroke.

A compensating mechanism by which connecting rod is connected to the crank arm may be necessary, if the variation of the compression ratio due to the finite length of connecting rod is not acceptable.

This mechanism may take the form or shape of a telescopic connecting rod, which may be shortened or lengthened eg. by hydraulic or pneumatic means. Mechanical means, such as for example, an eccentric bearing mounting assembly which is adaptable for adjustment to shorten or lengthen the distance between the longitudinal axis of the crank arm and top of piston, while maintaining relative compression ratios, may also be provided or any other mechanical means or combination of mechanical/hydraulic/pneumatic/electrical means such as the use of solenoids. One form of bearing mounting assembly comprises a separate aspect of the invention and is described below.

A bearing mounting assembly according to another aspect of the present invention which is suitable for use with the adjustable stroke reciprocating mechanism described above may include a main bearing to which a connecting rod is connectible, a bearing carrier which is mountable on a crank arm and selectively rotatable on the crank arm includes an eccentric, the bearing being carried on the bearing carrier such that the carrier can rotate relative to the bearing such that because of the eccentric, the position of the end of the connecting rod is adjusted. The assembly further includes control means for causing the selective rotation of the bearing carrier.

The control means for causing the rotation of the eccentric may include a guide element and co-operating guide track operable so that the movement of the guide element along the guide track causes rotation of the eccentric. The track may be in the form of a spiral-like groove in the outer peripheral surface of the crank arm and the guide element may include an inwardly extended projection on the carrier, the projection being located within the croove. It will be appreciated that the groove could be in the carrier and the projection on the crank arm. The control means for causing the rotation may further include an actuator which cause movement of the projection in a direction generally parallel to the axis of the crank shaft so that it tracks along the groove. It will be appreciated that the projection could be on the crank shaft and the groove on the bearing carrier.

The actuator may be in the form of a piston operatively connected to the carrier so that displacement of the piston in either direction causes the movement of the projection.

The piston may be in the from of an annulus surrounding the crank arm, the piston being disposed within a chamber. Inlets and outlets may be provided on either side of the piston for permitting the ingress and/or egress of a working fluid such as an hydraulic to act on the piston. Springs may be provided within the chamber which are adapted to act on the piston. The springs may be arranged to act on the carrier so as to lock it in the selected position.

The crank assembly can be in a variety of forms. For example, in one arrangement the assembly may include a support arm which is rotatable about the main axis, the crank arm being operatively connected to one end of the support arm with the other end of the support arm being operatively connected to the rotating member which is rotatable about the main axis. The rotating member may be in the form of a shaft. In one form, the shaft may be adapted to carry a gear, contoured flywheel, or pulley or other transmission device or devices.

In one embodiment, the support arm may comprise a disk like or plate like element mounted for rotation about the main axis. In this particular form of the invention, the crank arm is secured to or formed integral with the disc like element with it's longitudinal axis being inclined with respect to the main axis of the disc like body. In one preferred form, the crank arm is connected at one end to the disc like body and has a free end which is generally disposed in the region of the main axis of the disc like body.

In another embodiment the support arm may be in the form of a rod, or plate bar interconnecting the crank arm and the rotating member.

In yet another embodiment the crank arm may be directly connected to the rotating member.

The connecting rod may in one preferred form be connected to the crank arm by means of an adjustable bearing which can be linearly adjustable along the crank arm in the direction of the longitudinal axis thereof.

The bearing surface of the carrier need not be cylindrical. It may for example have at least partially spherical surfaces.

Adjustment means may be provided for moving the adjustable bearings along the crank arm. Such adjustment means may be in the form of an adjustable mounting which is mounted so as to control the position of the adjustable bearing. In another arrangement, the link may be in the form of a hydraulic member which can be lengthened or shortened to cause adjustment of the position of the adjustable bearing.

The rotatable section of the crank assembly may be operatively connected to an output element which may comprise a gear mounted for rotation within a suitable bearing assembly.

Preferably, the mechanism comprises a housing which is at least in part hollow thereby forming a crank chamber and cylinder for receiving the piston therein. Preferably, the gear is mounted within the housing. The housing may include a cover member for enabling access to the gear and crank chamber.

Any number of piston cylinder assemblies may be provided including a single piston cylinder. In one preferred form, two piston cylinder assemblies are provided, each being inclined with respect to the main axis of the rotating member. Preferably, each piston is operatively connected to a common linearly adjustable bearing which in turn is mounted on a single crank arm either directly or via the bearing carrier.

In another embodiment, four piston/cylinder assemblies are provided, two of each of the pistons being associated with a respective one crank arm so that the two crank arms are mounted to a flywheel disposed within the crank chamber. Each group of two pistons cylinder assemblies have associated therewith an adjustment mechanism for causing adjustment of the position of the bearing or bearing carrier along the respective crank arm.

In another form of the invention, the crank arms may be coaxial and connected to one another or formed integral thus forming a single continuous crank arm with the rotatable sections being connected to respective ends thereof. In this form of the invention. the disc-like body is no longer provided. In another form of the invention. the crank arms are interconnected by a coupling arm in place of the disc-like body.

According to yet another aspect of the present invention there is provided a carrier and shaft assembly comprising a shaft or crank and a carrier mounted thereon for movement therealong and a control mechanism for controlling the movement of the carrier along the shaft or crank and for holding the crank in a selected position relative to the crank.

In one form control means includes a pair of cam surfaces on the shaft arranged side by side and extending in the general direction of the longitudinal axis of the shaft.

The cam surfaces are preferably arranged to slope in opposite directions relative to one another each having associated therewith a respective piston/cylinder assembly on the carrier and each piston having a follower operatively connected thereto the followers being adapted to track along respective cam surfaces. The pistons are movable in response to a working fluid being delivered or expelled form the cylinder so that the tracking of the followers along the cam surfaces causes movement of the carrier along the shaft.

Preferably cam surfaces are in the form of ramps having an inclined linear cam surface. Further, the followers may be in the form of rollers which bear on the cam surfaces.

In another form the control means may include a spiral shaped groove formed in one of either the carrier of the shaft and a guide element of the other of the carrier or shaft the guide element being adapted to track along the groove. There may further be provided an actuator for applying a force to the carrier to cause it to move along the shaft. Preferably, the actuator comprises piston disposed within a chamber movement of the piston being controlled by the ingress or egress of the working fluid to or from the chamber.

BRIEF DESCRIPTION OF THE INVENTION

Preferred embodiments will hereinafter be described with reference to the accompanying drawings and in those drawings:

FIG. 9 is a schematic side elevation of yet another embodiment;

FIGS. 10A, 10B, 10C are schematic side elevations of a bearing mounting assembly according to another aspect of the present invention;

FIG. 11 is a schematic side elevation of a further form of bearing mounting assembly;

FIG. 11A is a partial sectional view of the assembly shown in FIG. 11;

FIGS. 12A, 12B, 12C are schematic illustrations of a carrier/shaft assembly according to one preferred embodiment with the carriage shown in three different positions;

FIG. 13 is a schematic side elevation of the shaft shown in FIGS. 12A, 12B and 12C;

FIGS. 13A, 13B, 13C, 13D and 13E are sectional views taken along the lines A—A, B—B, C—C, D—D and E—E of FIG. 13 respectively;

DETAILED DESCRIPTION OF THE INVENTION

For balancing of first order main force, it is advantageous to have pairs of pistons, which are operated in exactly opposite directions, thereby cancelling there effects of main force to the outside of the mechanism. Preferably, the reciprocating axis of the piston operated in opposite direction are coaxial thereby also avoiding any mass moments.

Figure 1:
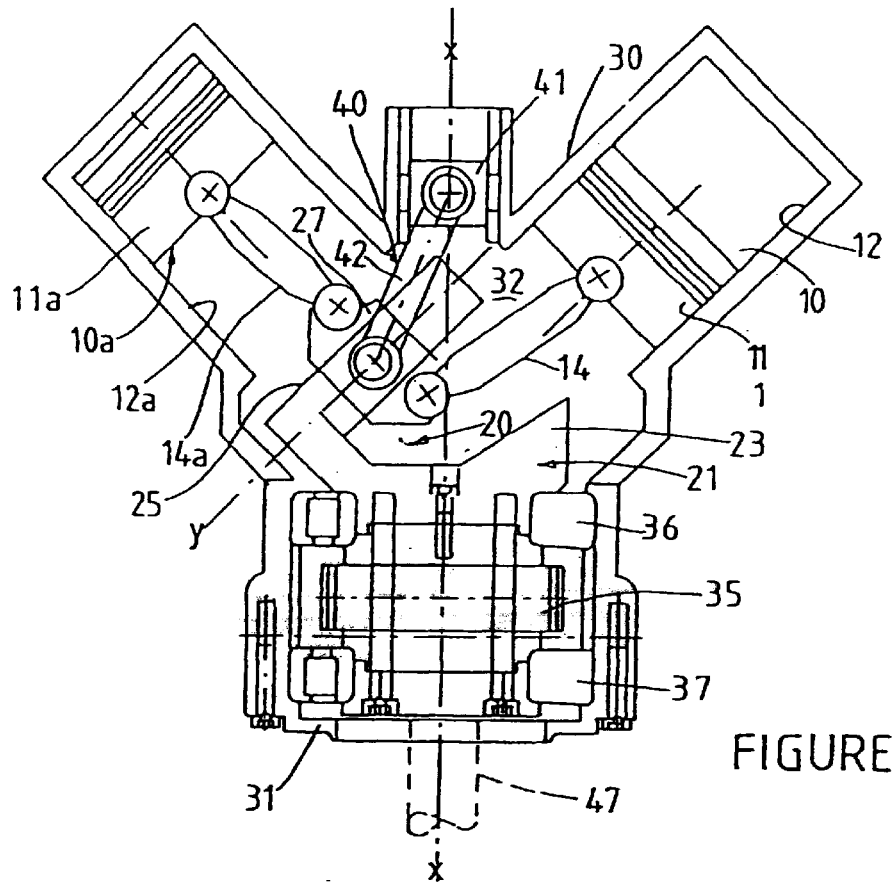
FIG. 1 is a schematic side elevation of an adjustable/reciprocating mechanism according to one aspect of the invention.
Figure 2:
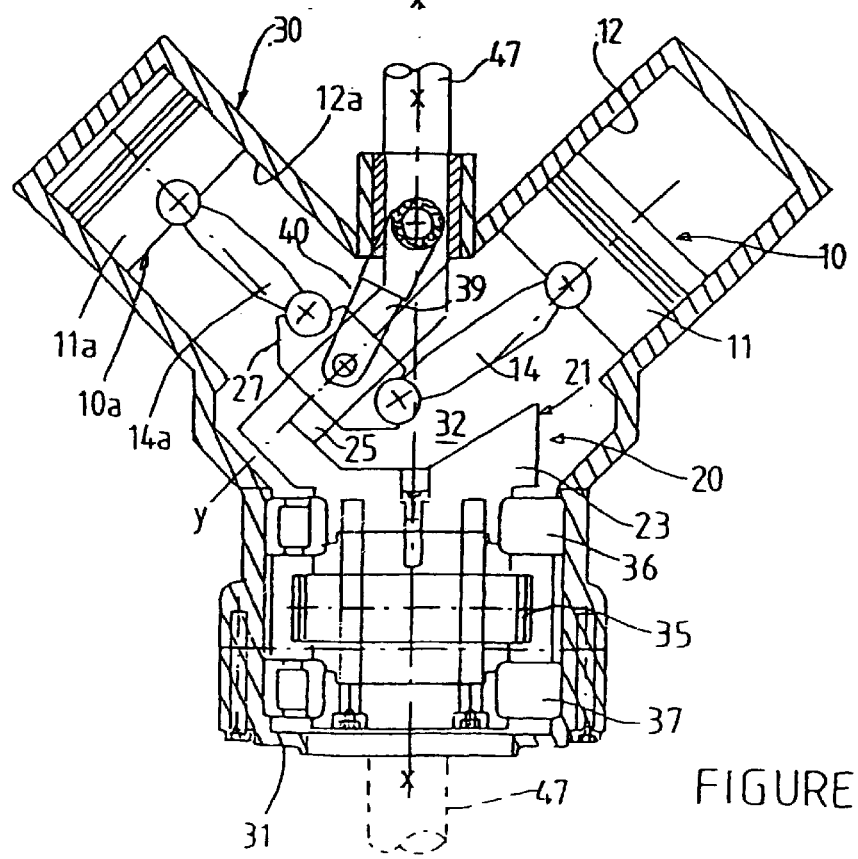
FIG. 2 is a similar elevation of a modified form of the device shown in FIG. 1.

Referring to FIGS. 1 and 2 of the drawings, there is shown an adjustable/reciprocating device generally indicated at 1, which comprises two reciprocators 10 and 10a, each comprising a piston 11 and 11a, disposed within a cylinder 12 and 12a. The cylinders 12 and 12a are formed as part of or attached to a housing 30 having a cover 31 providing access to a crank chamber 32. It will be appreciated that the cylinders could be formed separately from the housing.

Connecting rods 14 and 14a are operatively connected to respective pistons 11 and 11a.

A crank assembly 20 is disposed within the crank chamber 32 and comprises a support arm 21, having a main axis XX, the support arm 21 being in the form of a disc like body 23. The crank assembly further includes a crank arm 25 having a longitudinal axis YY, the crank arm being connected at one end of the disc like body 23 with it's free end being disposed generally in the region of the main axis XX of the rotatable section of the crank assembly. The crank arm could be curved or shaped so as to accommodate for constant compression ratios for a return to a preselected position of the piston at top dead center.

The connecting rods 14 and 14a are operatively connected to crank arm 25 via an adjustable bearing 27, the position of the adjustable bearing being movable along the crank arm 25 and in the form shown. along the direction of longitudinal axis YY.

Adjustment means 40, in the form of an adjustable mounting 41 and coupling rod or link 42, control the position of the bearing 27 on crank arm 25. The adjustment means as shown in FIG. 2 comprises a hydraulic link 39 which can be either shortened or lengthened to alter the position of the bearing 27.

The mechanism further includes an output gear 35 which is supported within the housing by means of bearings 36 and 37 and may have a rotating shaft 47.

Figure 3:
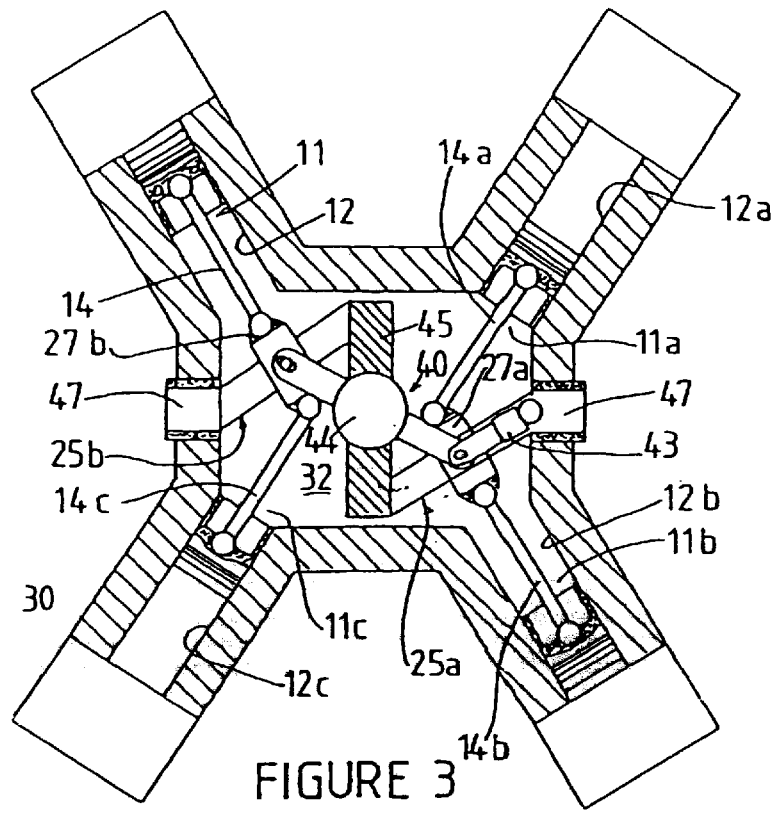
FIG. 3 is a schematic view of an adjustable/reciprocating mechanism according to another form of the present invention.
Figure 4:
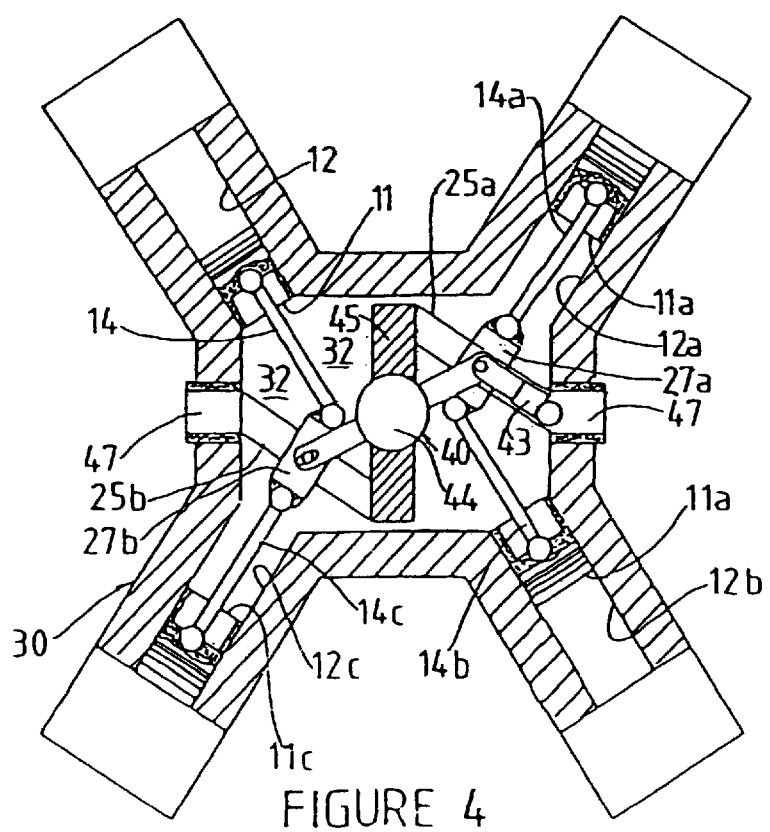
FIG. 4 is a schematic view of the device shown in FIG. 3 with the pistons in the opposite position to that shown in FIG. 3.

FIGS. 3 and 4 show a reciprocating mechanism which comprises four piston cylinder assemblies 11/12, 11a/12a, 11b/12b and 11c/12c. The piston cylinder assemblies are disposed within a housing 30 having a crank chamber 32 therein.

Each piston cylinder assembly has a connecting rod, 14, 14a, 14b and 14c associated therewith. Two of each of the connecting rods are associated with a respective crank arm 25a or 25b through adjustable bearings 27a and 27b. The crank arms are operatively connected to a flywheel 45 mounted within the crank chamber 32. The flywheel need not necessarily be mounted within the crank chamber. Adjustable means 40 comprises a hydraulic link 43 and coupling mechanism 44. Output from the system is by shaft 47.

Figure 5:
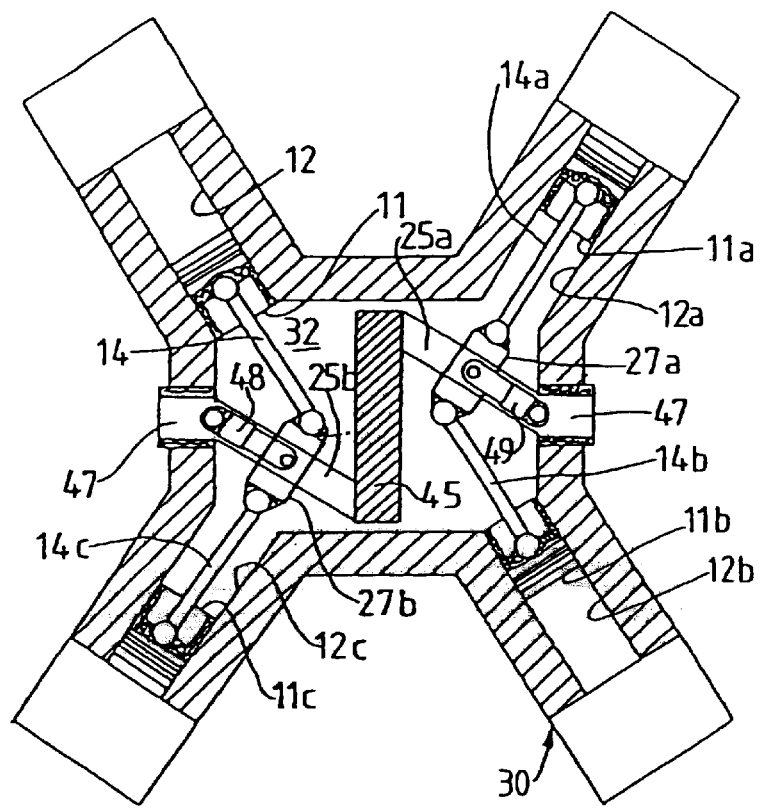
FIGS. 5 and 6 are schematic views of a modified form of the device to that shown in FIGS. 3 and 4.
Figure 6:
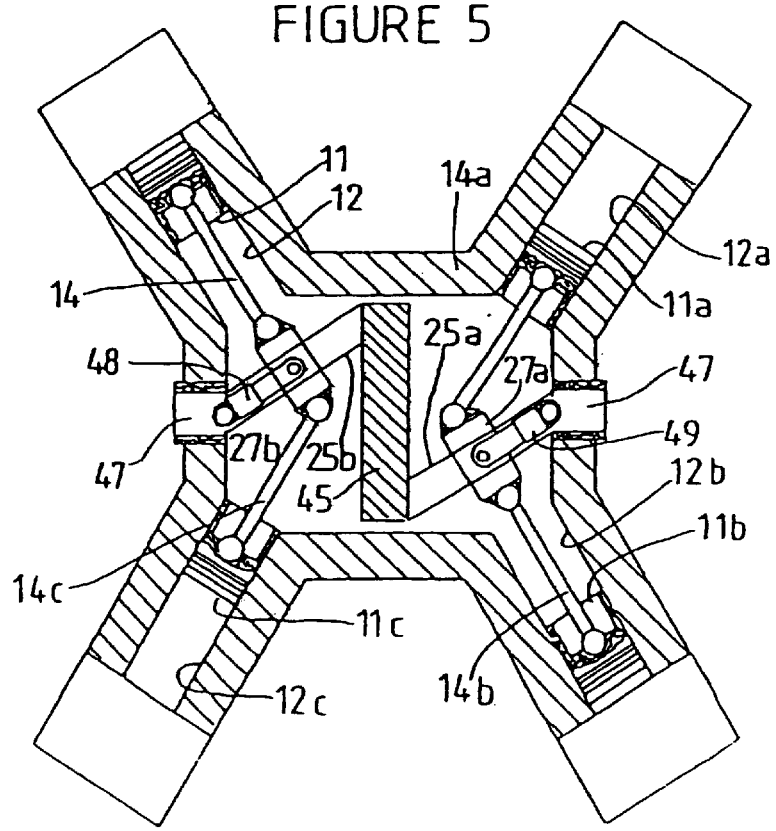

In the embodiment of FIG. 5 and 6, the reciprocating mechanism is similar to that shown in FIGS. 3 and 4, except that the adjustment mechanism 40 comprises two separate hydraulic links 48 and 49.

It will be appreciated that further piston/cylinder assemblies could be provided in series (that is axis to axis) or in another arrangement the flywheel 45 could be in the form of a combined flywheel and/or take off gear.

Figure 7:
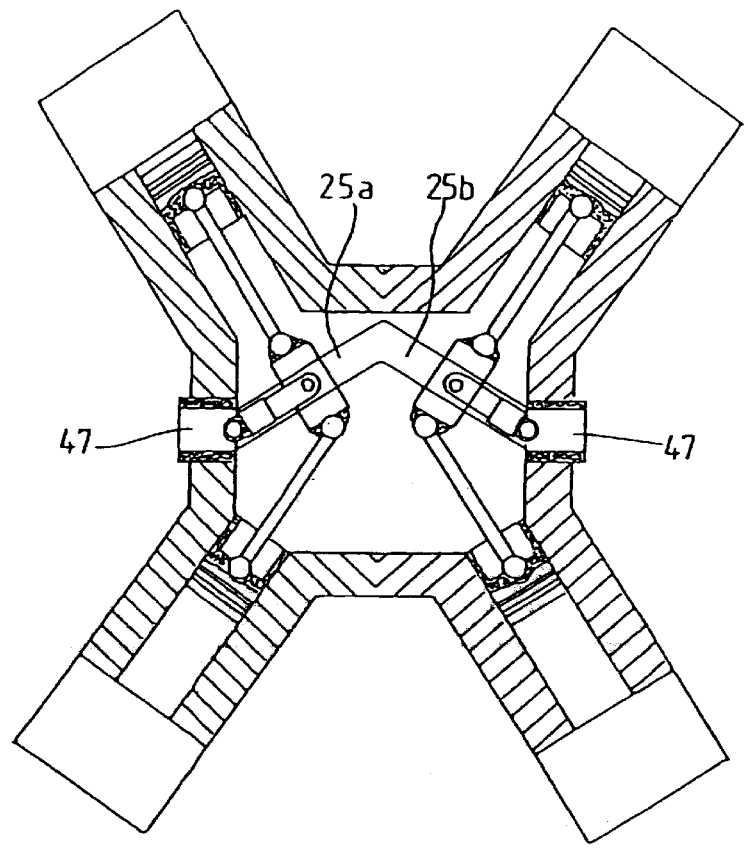
FIG. 7 is a schematic side elevation of a further embodiment.

FIG. 7 is similar to the embodiments of FIGS. 3 to 6 but has a different crank assembly configuration. As shown in FIG. 7 there are two crank arms 25a and 25b which are connected together at one end with the other end of each crank arm being connected to a respective rotating shaft 47.

Figure 8:
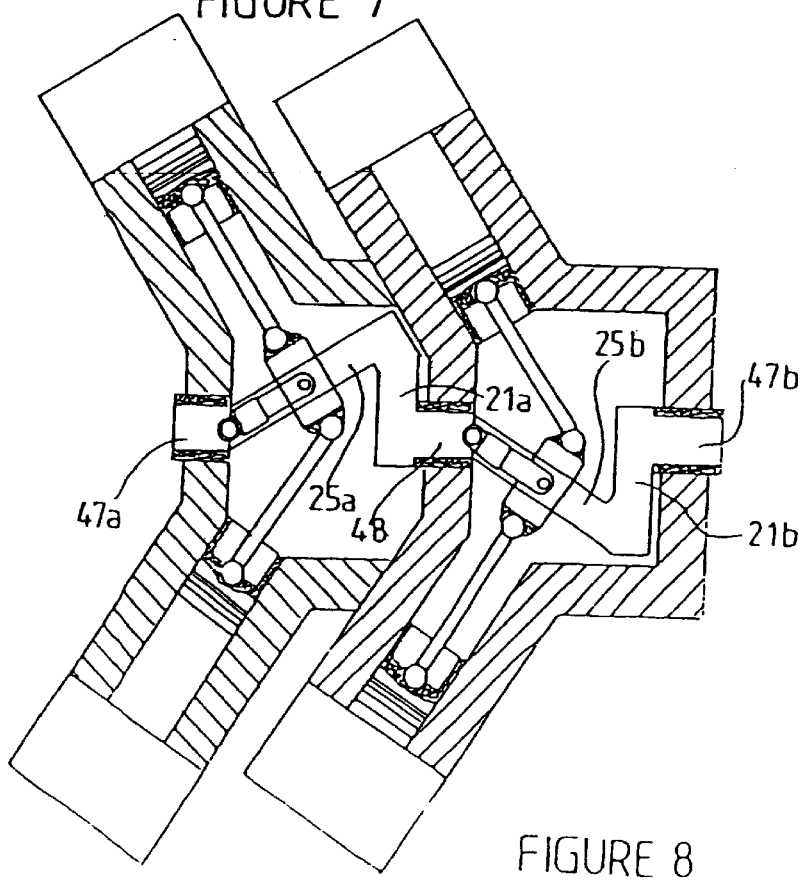
FIG. 8 is a schematic side elevation of yet another embodiment.

FIG. 8 shows two devices which are similar in structure to that shown in FIGS. 1 and 2 with the devices arranged in series. In this embodiment, the crank assembly for each device comprises respectively, a crank arm 25a and 25b and a rotatable support arm 21a and 21b. Crank arm 25a is operatively connected to rotating shaft 47a and support arm 21b is operatively connected to rotating shaft 47b. The two crank assemblies are interconnected via coupling shaft 48. It will be appreciated that they could be formed as a unitary shaft, and that arrangement may consist of more than two such devices. Furthermore, support arms 21a and 21b may be in the form of flywheel(s).

FIG. 9 shows a further modified form in which each crank assembly is operatively connected to a flywheel 50 which is disposed in a separate chamber. The crank assembly in each case comprises respectively crank arms 25a and 25b and support arms 21a and 21b. Crank arm support 21a is disposed at right angles to the longitudinal axis of the crank arm, however any other appropriate angle may be utilized.

In another embodiment, the flywheel may be in the form of an armature or magnet for generating electric power as a result of rotation thereof.

The flywheel when used may have at it's periphery a contoured surface consisting of troughs and peaks so as to activate the closing and opening of valves in the cylinder heads.

Furthermore, it will be appreciated that the configuration of the two by two cylinders in series as shown by FIG. 8, can also be in the form of single cylinders linked to the crank arm bearing and forming a multi-cylinder device which can also be connected in series.

Referring to FIGS. 10 and 11, the bearing and mounting assembly 100 includes a bearing 127 operatively connected to connecting rod 114. The bearing 127 is mounted on a bearing carrier 120 which is mounted for selective rotation and positioning on the crank arm 125 and includes an eccentric portion 121.

Control means 130 comprises a guide track 131 in the form of a spirally shaped groove 132 for receiving a guide element 133 in the form of a projection 134 on the internal surface of the carrier 120.

An actuator 135 in the form of a piston 136 which is displaceable within chamber 137 is provided for causing lateral movement of the carrier. Springs 139 may be provided within the chamber as shown in FIG. 11. Springs 139 urge the "head" section 136 against surface 138 of carrier 130 to lock or hold the carrier in the selected position.

Referring to FIG. 10 control of piston 136 is effected by the introduction or egress of an operating fluid such as for example an hydraulic fluid into chamber 137 either to one or the other side of the piston 136.

In FIG. 11 the operating fluid flows into or from chambers 137 in a pulsing fashion to cause engagement or disengagement of the surfaces of piston 136 and carrier surface 138 thereby locking or holding the carrier in the selected position or alternatively permitting movement of the carrier into a new position whereafter locking can be effected again. Delivery of the operating fluid may be via channels within crank arm 125. It will be appreciated that a similar form of spring assembly and piston assembly could be incorporated into the embodiment of FIG. 10.

Figure 14:
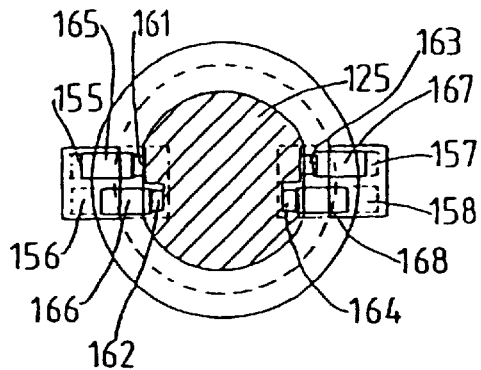
FIGS. 14A, 14B and 14C are schematic sectional views of the carrier/shaft assembly shown in the positions in FIGS. 12A, 12B and 12C respectively.
Figure 14:
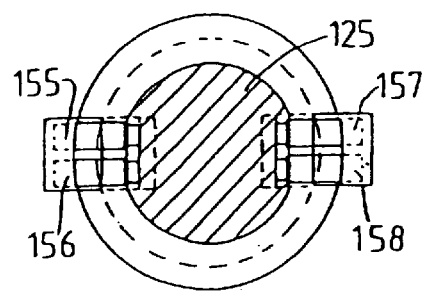
Figure 14:
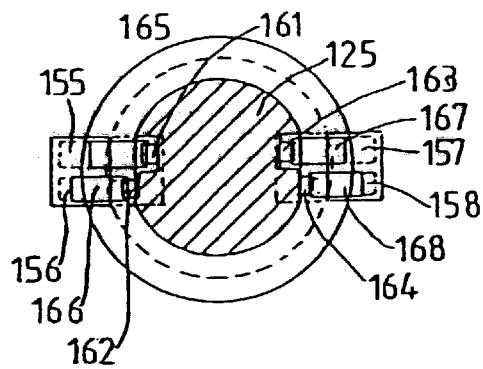

A further mechanism by which the carriage can be positioned and held in a selected position on the crank arm or shaft is shown in FIGS. 12 to 14.

As shown the carrier 120 is supported on a shaft or crank 125, the carrier 120 being adapted for movement relative to shaft or crank 125 between the extreme positions shown in FIGS. 12A and 12C. A control mechanism generally indicated at 150 controls the movement and positioning of the crank and carrier relative to one another.

As best seen in FIG. 13 the shaft or crank 125 has two sets of ramped sections 151, 152, 153 and 154 which are arranged side by side and extend in the direction of the longitudinal axis of the shaft or crank 125. The ramps 151 and 152 (first group) and 153 and 154 (second group) are arranged so as to be inclined in opposite directions. It will be appreciated that a single set or more than two sets could be provided.

The control mechanism comprises cylinders 155, 156, 157 and 158 respectively associated with one of the ramps, each cylinder being adapted to deliver a working fluid to a follower 161, 162, 163 and 164. The followers are in the form of rollers which are operatively connected to pistons 165, 166, 167 and 168. By controlling the delivery or discharge of the working fluid to or from the cylinders the followers will track along ramps with which they are associated thereby causing relative movement between the carrier and the shaft or crank. The followers fluid driven cylinders may be inclined anywhere from vertical or horizontal to the crank arm.

It will be appreciated that the various control mechanisms could be suitable for applications other than that described earlier and reference to that particular application is not to be taken as a limitation on the scope of this particular aspect of the invention.

Figure 15:
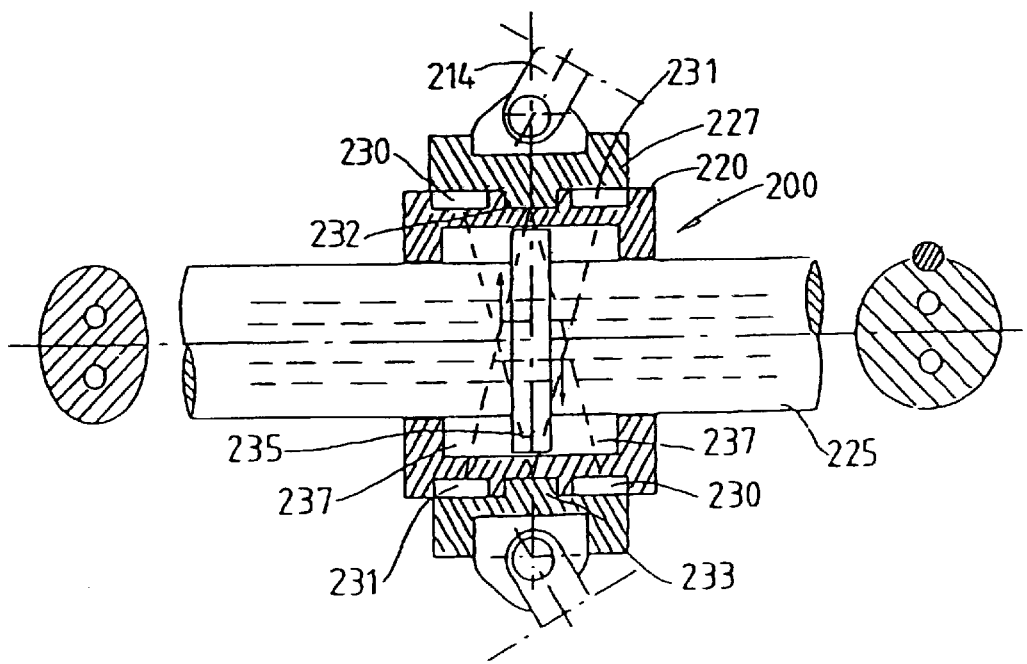
FIG. 15 is a schematic sectional side elevation of a further embodiment of a bearing moulding assembly according to the invention.

FIG. 15 shows yet another embodiment of bearing mounting assembly. The assembly 200 includes a bearing 227 operatively connected to connecting rod 214. The bearing 227 is mounted on a bearing carrier 220 which is mounted on crank arm or shaft 225.

In this embodiment relative rotation between the crank arm 225 and the bearing carrier is precluded. This may be achieved by having a crank arm of oval cross-section as shown on the left of FIG. 15 or have the crank arm keyed to the carrier as shown to the right of FIG. 15. It will be appreciated that other cross-sections such as a K shaft may be used.

The control means linking the carrier to the bearing comprises a pair of grooves 230 and 231 with cooperating projections 232 and 233. The crank arm or shaft has a disc 235 formed thereon which is disposed within a chamber 237 formed in the carrier 220. By the selective ingress or egress of working fluid into the chamber will cause displacement of the carrier along the crank arm. Locking means (not shown) may be provided to hold the carrier in the selected position. The locking means may for example be in the form of a plunger or piston disposed within the disc for radial movement towards the surface of the chamber. The piston head and the chamber surface may be serrated or of toothed configuration to cause the two parts to lock together.

Finally, it is to be understood that the inventive concept in any of its aspects can be incorporated in many different constructions so that the generality of the preceding description is not to be superseded by the particularity of the attached drawings. Various alterations, modifications and/or additions may be incorporated into the various constructions and arrangements of parts without departing from the spirit or ambit of the invention.

The claims defining the invention are as follows:

1. An adjustable stroke reciprocating mechanism including a reciprocating member mounted for reciprocating movement, a rotating member mounted for rotation about a main axis, a connecting rod operatively connected to the reciprocating member and, a crank assembly including a crank arm having a longitudinal axis which is inclined with respect to the main axis and disposed at right angles to the axis of reciprocation of said reciprocating member when the reciprocating member is at top dead center or at a most remote position from the crank arm, with at least a portion of the crank arm being adapted to revolve about the main axis, the connecting rod being operatively connected to the crank arm and adjustably positioned along the length thereof in either direction along the longitudinal axis of the crank arm.

2. A mechanism according to claim 1 wherein said reciprocating members includes a piston which is disposed within a cylinder, one end of said connecting rod being operatively connected to said piston and the other end being operatively connected to said crank arm.

3. The mechanism according to claim 1 or 2 wherein said crank assembly includes a support arm which is rotatable about the main axis, the crank arm being operatively connected to one end of the support arm with the other end of the support arm being operatively connected to the rotating member which is rotatable about the main axis.

4. The mechanism according to claim 1 or 2 wherein said support arm comprises a disk like element mounted for rotation about the main axis, said crank arm being secured to or integral with the disc like element with it's longitudinal axis being inclined with respect to the main axis of the disc like element.

5. The mechanism according to claim 1 or 2 wherein said connecting rod is connected to the crank arm by means of an adjustable bearing which can be linearly adjustable along the crank arm in the direction of the longitudinal axis thereof.

6. The mechanism according to claim 5 further including adjustment means for moving the adjustable bearing along the crank arm, said adjustment means comprising an adjustable mounting which is mounted so as to control the position of the adjustable bearing.

7. The bearing mounting assembly which is suitable for use with the adjustable stroke reciprocating mechanism according to claim 1 or 2 including a main bearing to which the connecting rod is connectible, a bearing carrier which is mountable on the crank arm and selectively rotatable on the crank arm and includes an eccentric, the bearing being carried on the carrier such that the carrier can rotate relative to the bearing such that because of the eccentric the position of the end of the connecting rod can be adjusted and control means for causing the selective rotation of the bearing carrier.

8. The bearing mounting assembly according to claim 7 wherein said control means includes a guide element and co-operating guide track operable so that the movement of the guide element along the guide track causes rotation of the carrier.

9. The bearing mounting assembly according to claim 8 wherein said track includes spiral-like groove in the outer peripheral surface of the crank arm and the guide element includes an inwardly extending projection on the carrier, the projection being located within the groove, and an actuator which cause movement of the projection in a direction generally parallel to the axis of the crank shaft so that it tracks along the groove.

10. The bearing mounting assembly according to claim 9 wherein said actuator includes a piston operatively connected to the carrier so that displacement of the actuator position in either direction causes the movement of the projection.

11. The bearing mounting assembly according to claim 10 wherein said piston is in the form of an annulus surrounding the crank arm, the actuator piston being disposed within a chamber, with inlets and outlets for permitting the ingress and/or egress of a working fluid such as an hydraulic to act on the actuator piston.

12. The mechanism according to claim 1 wherein the crank arm comprises a shaft and the connecting rod comprises a carrier movable along the shaft, and further including a control member for controlling the movement of the carrier along the shaft, and for holding the carrier in a selected position relative to the shaft.

13. The mechanism according to claim 12 wherein said control mechanism includes a pair of cam surfaces on the shaft arranged side by side and extending in the general direction of the longitudinal axis of the shaft, the cam surfaces being arranged to slope in opposite directions relative to one another, each cam surface having associated therewith a respective piston/cylinder assembly on the carrier, each piston having a follower operatively connected thereto, the followers being adapted to track along the respective cam surfaces, the pistons being movable in response to a working fluid being delivered or expelled from the cylinders so that the tracking of the followers along the cam surfaces causes movement of the carrier along the shaft.

14. The mechanism according to claim 13 wherein said cam surfaces are in the form of ramps having inclined linear cam surfaces.

15. The mechanism according to claim 14 wherein said followers are in the form of rollers which bear on the cam surfaces.

16. The mechanism according to claim 12 wherein said control means includes a spiral shaped groove formed in one of either the carrier or shaft and a guide element on the other of the carrier or shaft the guide element being adapted to track along the groove.

17. The mechanism according to claim 16 including an actuator for applying a force to the carrier to cause it to move along the shaft.

18. The mechanism according to claim 17 wherein the actuator comprises a piston disposed within a chamber, the movement of the piston being controlled by the ingress or egress of the a working fluid to or from the chamber.

* * * * *